June 26, 1951

W. B. SMITH 2,558,108

LINEAR VACUUM TUBE VOLTMETER

Filed Oct. 10, 1947

INVENTOR.
Wilbert Brockhouse Smith

BY Alex E. MacRae

Attorney.

Patented June 26, 1951

2,558,108

UNITED STATES PATENT OFFICE 2,558,108

LINEAR VACUUM TUBE VOLTMETER

Wilbert Brockhouse Smith, Ottawa, Ontario, Canada

Application October 10, 1947, Serial No. 779,159

1 Claim. (Cl. 171—95)

This invention relates to vacuum tube voltmeters.

An object of this invention is to provide a vacuum tube voltmeter having a linear relationship between the voltage applied to the tube grid and the current flowing through the meter and possessing great stability, with substantial immunity against damage to the meter through application of excessive input voltage and minimized effect of changing tube characteristics. Another object is to provide a vacuum tube voltmeter which utilizes negative driving voltage with no appreciable current.

Figure 1:
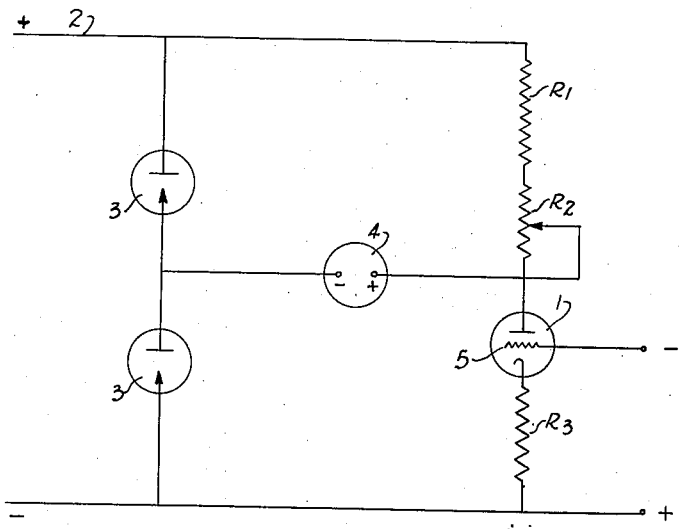
Figure 2:
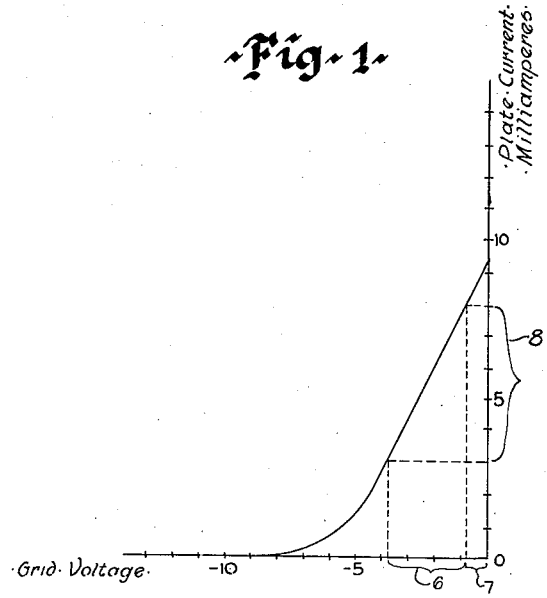

The invention will be described with reference to the accompanying drawing, in which Figure 1 is a circuit diagram of a voltmeter in accordance with the invention, and Figure 2 is a graphic chart showing the grid voltage vs. plate current characteristic of the vacuum tube employed.

In the drawing, 1 is a vacuum tube comprising a triode, which may be a type 6J5, having a substantially linear characteristic at low bias voltages.

Plate voltage is applied to the tube from a source 2 through a resistance $R_1$ connected in series with the plate. The resistance $R_1$ has a variable portion $R_2$ whereby the total resistance is made equal to the plate resistance of the triode.

Bias for the tube is obtained from a small resistance $R_3$ in series with its cathode and which is only sufficient to offset the thermionic voltage of the tube, i. e., about 0.8 volt.

The power supply is center tapped conveniently by means of two gaseous voltage regulators 3 in series.

The indicating or recording instrument 4 is connected between the plate of the tube and the center tap of the power supply, as shown.

In the circuit as shown, with the application of negative voltage to the grid 5 of the triode, the plate current decreases linearly and the current through the indicating instrument 4 increases by an equal amount.

Referring to Figure 2, 6 indicates the excursion of input voltage, 7 the bias to offset thermionic voltage, and 8 the excursion of plate current which flows through the recorder. It will be observed that, even if excessive negative voltage is applied to the grid of the triode, the current through the indicating instrument is limited automatically to, for instance, approximately 8 milliamperes, which is a safe margin for a 5 milliampere indicating instrument.

The following table gives typical values which may be employed in the instrument:

Triode=Type 6J5
$V=105$ volts
$I=8$ ma.
$i_r=0$ to 5 ma.
$R_1=10,000$ ohms
$R_2=1$-5000 ohms
$R_3=100$ ohms
Recorder $r=500$ ohms
$e_g=0$ to $-3$ volts Obviously, the circuit may be adapted to measure positive voltages by simply applying an extra fixed bias equivalent to the normal excursion of negative input voltage, increasing the resistance in series with the plate of the tube to equal the new tube plate resistance, and reversing the polarity of the recorder.

What is claimed is:

A vacuum tube voltmeter comprising a two-connection power supply, a triode vacuum tube having an internal plate resistance, an external resistance connected in series with the plate of the tube, said external resistance being adjustable to equal the value of said internal resistance, said tube and external resistance being connected across said power supply, means establishing a point of substantially constant potential midway between said power supply connections, a current measuring instrument connected to said midpoint and to the plate of the tube, and means for applying input voltage to the grid of the tube, the current flowing through said instrument being substantially proportional to the voltage applied to the grid of the tube.

WILBERT BROCKHOUSE SMITH.

REFERENCES CITED

The following references are of record in the file of this patent:

UNITED STATES PATENTS

| Number | Name | Date |
|---|---|---|
| 2,326,614 | Bowman | Aug. 10, 1943 |
| 2,374,248 | Tuttle | Apr. 24, 1945 |
| 2,389,991 | Mayle | Nov. 1, 1945 |

FOREIGN PATENTS

| Number | Country | Date |
|---|---|---|
| 584,059 | Great Britain | Jan. 6, 1947 |